United States Patent [19]

Davidson et al.

[11] 4,147,294
[45] Apr. 3, 1979

[54] ROTOR CARRIER FOR MICROTITRATION PLATE

[75] Inventors: Howard R. Davidson, Menlo Park; Brian J. Bayley, Palo Alto, both of Calif.

[73] Assignee: Beckman Instruments, Inc., Fullerton, Calif.

[21] Appl. No.: 879,940

[22] Filed: Feb. 22, 1978

[51] Int. Cl.² .............................................. B04B 5/00
[52] U.S. Cl. ..................................................... 233/26
[58] Field of Search ...................... 233/26, 1 R, 11, 27

[56] References Cited

U.S. PATENT DOCUMENTS

| | | | |
|---|---|---|---|
| 3,454,217 | 7/1969 | Harbott | 233/26 |
| 3,674,198 | 7/1972 | Eberle | 233/26 |
| 3,722,791 | 3/1973 | Luright | 233/26 |
| 4,009,824 | 3/1977 | Wright | 233/26 |

FOREIGN PATENT DOCUMENTS

| | | | |
|---|---|---|---|
| 505446 | 5/1939 | United Kingdom | 233/26 |
| 527712 | 10/1940 | United Kingdom | 233/26 |

OTHER PUBLICATIONS

*Centrifuge Plate Carriers,* Cooke Laboratory Products, Div. of Dynatech Laboratories Inc.

*Primary Examiner*—George H. Krizmanich
*Attorney, Agent, or Firm*—R. J. Steinmeyer; F. L. Mehlhoff; William H. May

[57] ABSTRACT

A carrier assembly for pivotal placement on a swinging carrier rotor wherein the carrier has a support member which maintains the carrier assembly in a centered location between the hinge pins on the rotor. The carrier assembly has a frame unit which holds a microtitration plate containing samples to be centrifugated. The support member in the carrier assembly is slidably engaged with the frame unit and eliminates the need for welds. Each end of the support member has a generally semi-circular sleeve portion which provides for the easy placement and removal of the carrier assembly from the rotor hinge pins. Retaining means are positioned on the support member to prevent deflection of the carrier frame unit along the support member during centrifugation.

5 Claims, 3 Drawing Figures

ROTOR CARRIER FOR MICROTITRATION PLATE

BACKGROUND OF THE INVENTION

The present invention relates to swinging type centrifuge rotors and, more particularly, relates to a swinging carrier for a centrifuge rotor to support a microtitration plate.

In certain types of analysis work microtitration plates are utilized to determine the sedimentation characteristics of various fluid samples for evaluation to determine the content and/or characteristics of the particular fluid samples. The microtitration plate is one integral relatively thick plate made of plastic type of material and normally having nine rows of twelve cavities into which cells or other particles and serial dilutions of body fluids are directly placed. When it is necessary to utilize centrifugation to aid in estimating the amount of reactants in the precipitate or supernatant of these sample dilutions, the plate is placed in a rotor carrier for subjection to centrifugal forces induced during centrifugation.

Typically, the carrier arrangement is pivotally attached to hinge pins in the yoke of the rotor structure to allow for the pivoting of the microtitration plate from a generally horizontal orientation when the rotor is at rest to a vertical orientation during operational speeds of centrifugation. The carrier assembly has a frame unit made of sheet metal, such as aluminum, to which is welded a transverse support member that pivotally attaches the entire carrier assembly with the microtitration plate to the rotor hinge pins.

The carrier frame unit is welded to the support member. However, it is very difficult to ensure that the welds are perfect with no defects. Since one of the primary areas of presently used microtitration plate carriers subject to fatigue and failure during centrifugation is the weld joint, the welding must be extremely good in order to avoid failure. It is very costly to provide the necessary inspection of the welds. One of the primary reasons that the weld joints are subjected to extreme stress during centrifugation is due to the fact that the frame unit of sheet metal will be subjected to some deflection during centrifugation. In other words, the sides or upward extending hanger portions of the frame unit which attach to the support member will tend to deflect inward as the bottom surface of the frame unit is subjected to high centrifugal forces when carrying the microtitration plate.

The support member for presently used carrier assemblies is typically a hollow tubular member which is welded to the sheet aluminum material that forms U-shaped frame unit into which the microtitration plate is placed. A significant problem which occurs during centrifugation is the possibility that the overall carrier assembly may become shifted toward one of the hinge pins and away from the other opposing hinge pin in the yoke area of the rotor resulting in possible disengagement of the carrier assembly from the rotor frame. The stresses experienced by the rotor frame and its radially extending arms which form the yoke in some instances may result in total dimensional tolerance values which would be in conjunction with the tubular support member design sufficient enough to result in the carrier assembly becoming disengaged from the rotor frame. If such a circumstance would occur, it would result not only in damage to the fluid sample being subjected to centrifugation, but also considerable damage to the centrifuge.

SUMMARY OF THE INVENTION

The present invention is a rotor carrier assembly having a frame unit with two upright hangers each with a support aperture into which is slidably mounted a pivot bar that not only provides the support for the overall carrier assembly, but also provides for positive centering of the carrier unit between the hinge pins of the rotor. The carrier assembly also incorporates the use of anchoring rings which are snapped into place in annular grooves on the pivot bar adjacent the interior face of each of the hanger members or side plates of the carrier unit to prevent any inward deflection or movement of the hanger members along the pivot bar during centrifugation.

The pivot bar is generally a solid semicylindrical member which is not rigidly attached to the frame unit. Therefore, no welding joints are used between the respective pieces which would be subjected to fatigue and failure during centrifugation. Each end of the pivot bar has a semicylindrical sleeve for receipt of the hinge pins of the rotor. The ends of the solid portion of the pivot bar which are found within the sleeve portions are designed to closely mate with the outer end faces of the hinge pins, so that the carrier assembly is maintained in a proper centered position between the hinge pins during centrifugation.

Because each of the semicylindrical sleeve portions has one side open, the carrier assembly can be easily removed or replaced on the hinge pins. The apertures in the side plates or hanger members of the frame unit are semicircular to mate with the generally semi-cylindrical pivot bar to prevent a relative rotative movement between the frame carrier unit and the pivot bar.

During centrifugation the non-rigid attachment between the pivot bar and the carrier frame unit eliminates the concern with respect to any fatigue or failure that a weld joint presents in prior arrangements. Further, the utilization of anchoring rings on the pivot bar adjacent the interior face of each of the side plates of the carrier unit retains the side plates in a fixed position on the pivot bar to prevent deflection of the plates toward each other during centrifugation.

Therefore, the present carrier invention is not only easily installed and removed from the rotor, but also provides the proper centering of the carrier assembly between the hinge pins during centrifugation. The design of having a slidably engaged pivot bar into the frame carrier unit of the assembly with the anchoring rings without the utilization of any welding provides for an easily manufactured and assembled carrier assembly and eliminates the failure concerns associated with a welded joint.

DETAILED DESCRIPTION OF THE INVENTION

Figure 1:
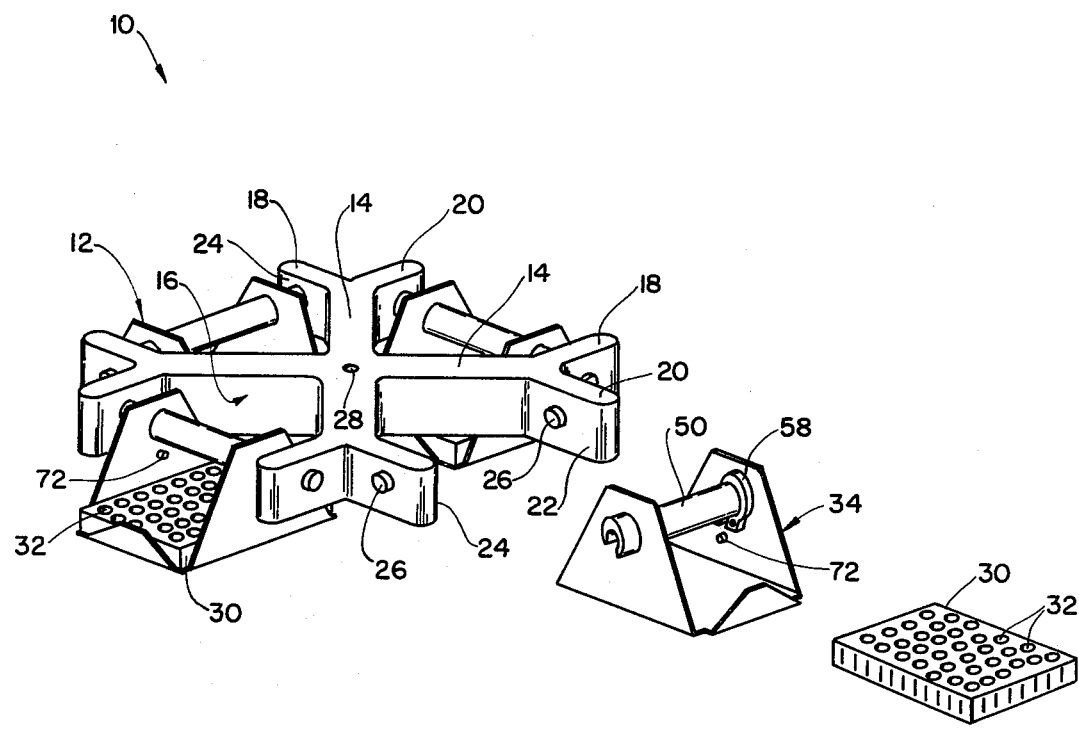
FIG. 1 is a perspective partial exploded view of the rotor with the microtitration plate carrier assembly.

FIG. 1 shows a rotor 10 having a plurality of pivotally mounted carrier assemblies 12. The rotor has four radially extending arms 14 with each adjacent pair of arms forming a yoke area 16. At the end of each of the radial arms 14 are dual support extensions 18 and 20. The interior face 22 of one support extension 20 and the interior face 24 of the other support extension 18 are parallel to each other for holding the hinge pins or pivot junctions 26 in opposing alignment with each other within each yoke area 16. The rotor 10 is designed to spin about a shaft 28 which is connected to drive means (not shown) to provide the required rotational speeds. The rotor 10 is placed within a centrifuge housing (not shown) for operation.

Figure 2:
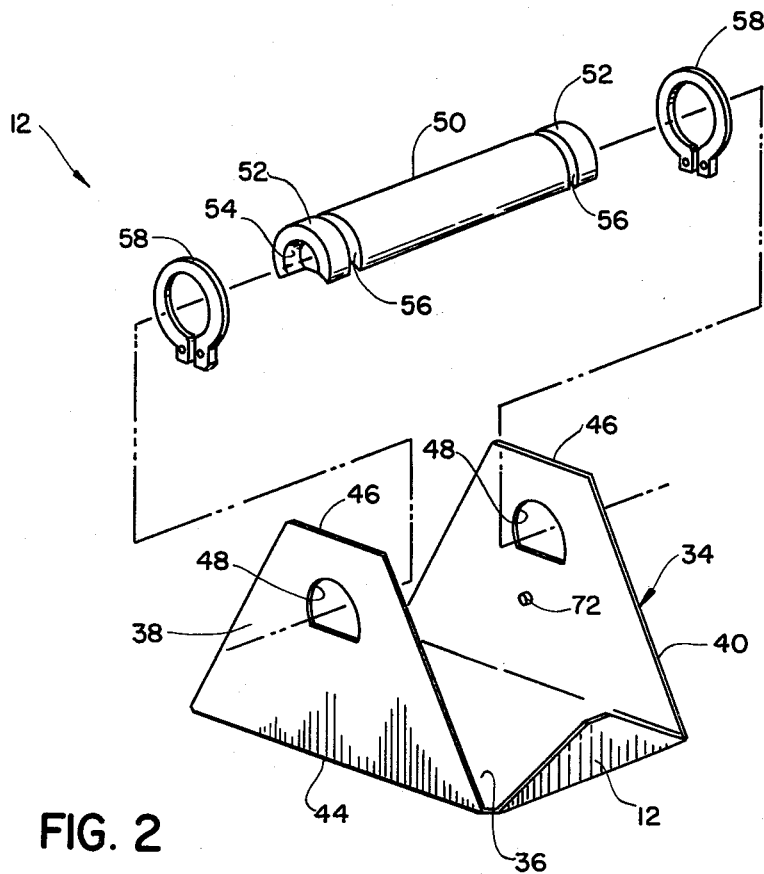
FIG. 2 is an exploded perspective view of the microtitration carrier assembly.

Located in each of the yoke areas 16 of the rotor 10 is a carrier assembly 12 which contains a microtitration plate 30 having a plurality of cavities 32 for carrying sample dilutions to be subjected to centrifugation. As shown more clearly in FIG. 2, each carrier assembly 12 has a carrier frame unit 34 with a bottom support plate 36 and a pair of upright hanger members or side walls 38 and 40. Also located on the bottom support plate 36 are two end flanges 42 which hold in conjunction with the hanger members 38 and 40 the microtitration plate 30 within the frame unit during centrifugation. The hanger members or side plates 38 and 40 are generally perpendicular to the support plate 36. The hanger members have a general trapezoidal shape of the same size with the longer side 44 being adjacent the bottom support plate 36 and the shorter side 46 being remote from the plate 36. Located within each of the carrier hanger members 38 and 40 is a semicircular support aperture 48 located closer to the shorter side 46 of the hanger members 38 and 40. The support apertures 48 are in alignment with each other along a line parallel to the bottom support plate 36.

Slidably mounted within the support apertures 48 of the hanger members 38 and 40 is an elongated member or pivot bar 50 which is a solid bar having a generally semicylindrical shape. Located at each end of the pivot bar is a semicylindrical sleeve portion or pivot junction 52 forming an interior central recess 54 for receipt of the hinge pins 26 of the rotor 10. Located on the pivot bar 50 near the respective sleeve portions 52 at each end of the bar are annular grooves or slots 56 designed to receive anchoring rings 58.

Figure 3:
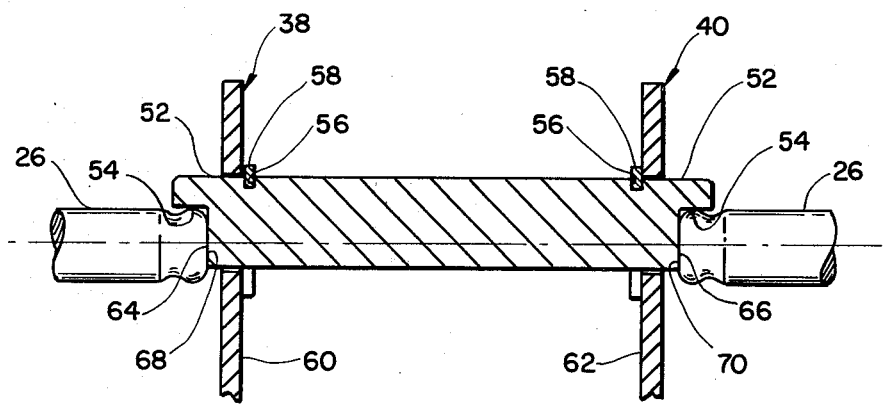
FIG. 3 is a partial sectional view of the carrier assembly in position on the rotor hinge pins.

Reference is made to FIG. 3 showing the relative position of the pivot bar 50 with respect to the hinge pins 26 and the hanger members 38 and 40. It should be noted that the anchoring rings 58 are located adjacent the respective interior faces 60 and 62 of the hanger members 38 and 40. Since the unit frame 34 is preferably made from aluminum sheet the hanger members 38 and 40 will tend to deflect toward each other during centrifugation as the centrifugally induced forces increase on the microtitration plate situated on the bottom support plate 36. However, the existence of the anchoring rings 58 adjacent the respective interior surfaces 60 and 62 of the hanger members 38 and 40 will prevent the deflection of the hanger members toward each other. Since the hanger members 38 and 40 are slightly prebiased toward each other, in the construction of the frame unit 34 they will remain closely adjacent the anchoring rings 58.

As shown in FIG. 3, the ends 64 and 66 of the solid portion of the pivot bar 50 are closely adjacent the outer faces or ends 68 and 70 of the hinge pins 26. Consequently, the pivot bar 50 maintains the overall carrier assembly 12 in its proper centered location between the hinge pins 26.

Located approximately midway between the support aperture 48 of each hanger member 38 and 40 and the support plate 36 is a blocking pin 72 designed to prevent the placement of two microtitration plates 30 in one carrier assembly 34. The blocking pins 72 are in opposing alignment with each other on the respective interior surfaces 60 and 62 of the hanger members 38 and 40. Since the carrier assembly 34 is designed to carry the load of only one microtitration plate 30, the blocking pins 72 are a safety feature in case a user would inadvertently attempt to insert two microtitration plates 30 in one carrier assembly. Otherwise, two microtitration plates in one carrier assembly 34 may cause carrier failure resulting in not only damage to the rotor, but also possible injury to the user.

The blocking pins 72 are positioned to permit one microtitration plate 30 to slide into the carrier assembly 34, but block the placement of a second microtitration plate on top of the first plate in the same carrier assembly.

Turning to the operation of the present invention, attention is directed to FIG. 1. The cavities 32 in the microtitration plate 30 are filled with fluid samples to be subjected to centrifugation. The microtitration plate is then placed on the bottom support plate 36 of the carrier assembly 12 between the hanger members 38 and 40 and the retaining flanges 42. The overall carrier assembly 12 is placed or hung by hand on the hinge pins 26. When the rotor 10 is at rest, the carrier assemblies 12 assume the orientation shown in FIG. 1 with the microtitration plates 30 in a generally horizontal orientation. However, as the rotor 10 is subjected to a rotational force by drive means (not shown), the sleeve portions 52 of carrier assemblies 12 will pivot about the hinge pins 26, so that as centrifugation speeds increase the microtitration plates 30 will assume a generally vertical orientation.

Although the hinge pins 26 are shown in the Figures attached to the rotor, it should be noted that the present device could be constructed with the hinge pins 26 on the pivot bar 50 and the sleeve portion 52 on the rotor.

As shown more particularly in FIG. 3, the fact that the ends 64 and 66 of the solid portion of the pivot bar 50 are closely adjacent the facing ends 68 and 70 of the pivot or hinge pins 26, the overall carrier assembly 12 will remain in its proper centered orientation with respect to the hinge pins. There will be substantially no relative movement between the pivot bar or the carrier assembly and the hinge pins, eliminating the possibility of the carrier assembly becoming disengaged from the rotor. The anchoring rings 58 on the pivot bar will prevent the hanger members 38 and 40 from tending to deflect toward each other along the pivot bar during high speed centrifugation. When the centrifugation operation has been completed and the rotor returns to its stationary orientation, the carrier assembly 12 will rotate the microtitration plate from its vertical orientation to its horizontal orientation as shown in FIG. 1 with the sleeve portions 52 of the pivot bar moving rotatively with respect to the stationary hinge pins 26.

When the rotor has come to a complete stop, the pivot bar can be grasped and the entire carrier assembly can be lifted from the rotor for easy and convenient removal of the microtitration plate. A new microtitration plate with samples to be centrifugated can be inserted in the carrier assembly 12. The entire assembly with the new microtitration plate is hung by hand on the hinge pins 26 and the centrifugation run can be initiated.

The present invention provides a conveniently assembled and manufactured carrier assembly which is easily removed from or replaced on the rotor frame. Further, the unique design of the carrier assembly components provides for the centering of the carrier assembly on the hinge pins and eliminates the need for the use of welds between the components of the carrier assembly which could be subjected to failure during centrifugation.

What is claimed is:

1. A rotor carrier assembly for mounting between a pair of pivot junctions in a rotor, said carrier assembly comprising:
   a support plate;
   A pair of upright hanger members integrally connected to said support plate;
   a single elongated member slidably and removably mounted through both of said pair of hanger members, each end of said elongated member having a flat portion and an extending open sided sleeve means for interface with a pair of respective pivot pins on said rotor, said flat portions of said elongated member being in face to face contact with the face surfaces of said pins to retain said carrier precisely centered between said pins, said elongated member not being rigidly attached to said hanger members; and
   a retaining member securely connected to said elongated member adjacent the interior surfaces of each of said hanger members to prevent said hanger members from moving on said elongated member toward each other during centrifugation.

2. A rotor carrier assembly as defined in claim 1, wherein said elongated member comprises a semicylindrically shaped pivot bar, said recessed central areas being semicylindrical with one side being open so that said bar can be removably placed on said rotor to permit the lifting of said carrier assembly off said rotor after centrifugation.

3. A rotor carrier assembly as defined in claim 1, wherein the distance between the flat portion of each end of said elongated member is substantially the same as the distance between the opposing faces of said pair of hinge pins so that said carrier assembly is positively centered between said pivot junctions on said rotor.

4. A rotor carrier assembly as defined in claim 1 wherein said retaining member comprises an anchoring ring located on said elongated member for retaining said hanger members in a fixed position on said elongated member to prevent said hanger members from deflecting toward each other during centrifugation, said elongated member having an annular groove adjacent the inside face of each of said hanger members for receipt of said anchoring rings.

5. A rotor carrier assembly as defined in claim 1, wherein each of said hanger members has a semicircular aperture and wherein said supporting and centering means comprises a semicylindrical bar for slidable insertion through said semicircular apertures to support said bottom support plate and said hanger members and prevent relative rotation between said bar and said hanger members.

* * * * *